(12) United States Patent
Bletz et al.

(10) Patent No.: US 7,227,495 B2
(45) Date of Patent: Jun. 5, 2007

(54) RADAR FILL-LEVEL SENSING DEVICE

(75) Inventors: Achim Bletz, Clerieux (FR); Thomas Musch, Bochum (DE)

(73) Assignee: Krohne S.A., Romans-Cedex (FR)

( * ) Notice: Subject to any disclaimer, the term of this patent is extended or adjusted under 35 U.S.C. 154(b) by 151 days.

(21) Appl. No.: 11/109,532

(22) Filed: Apr. 19, 2005

(65) Prior Publication Data

US 2005/0264442 A1 Dec. 1, 2005

(30) Foreign Application Priority Data

May 26, 2004 (DE) ...................... 10 2004 026 560

(51) Int. Cl.
*G01S 13/08* (2006.01)
(52) U.S. Cl. ...................... 342/124; 342/175
(58) Field of Classification Search ................ 342/124, 342/175
See application file for complete search history.

(56) References Cited

U.S. PATENT DOCUMENTS

| | | | | |
|---|---|---|---|---|
| 5,109,205 A | * | 4/1992 | Hart et al. ................... | 333/104 |
| 5,309,163 A | * | 5/1994 | Ngan et al. .......... | 343/700 MS |
| 5,511,238 A | * | 4/1996 | Bayraktaroglu .............. | 455/81 |
| 5,583,523 A | * | 12/1996 | Wallace, Jr. ................. | 343/741 |
| 6,091,355 A | * | 7/2000 | Cadotte et al. ............. | 342/104 |
| 6,246,377 B1 | * | 6/2001 | Aiello et al. ................. | 343/770 |
| 2004/0140814 A1 | * | 7/2004 | Bletz et al. ................. | 324/644 |
| 2005/0264442 A1 | * | 12/2005 | Bletz et al. ................. | 342/124 |
| 2006/0097906 A1 | * | 5/2006 | Heide .......................... | 342/22 |

FOREIGN PATENT DOCUMENTS

WO    WO 94/28592    12/1994

\* cited by examiner

*Primary Examiner*—John B. Sotomayor
(74) *Attorney, Agent, or Firm*—John F. McKenna; Cesari & McKenna, LLP

(57) ABSTRACT

A radar fill-level sensing device has a high-frequency unit that serves to generate and process radar signals of a predefined frequency and wavelength, an antenna for transmitting and/or receiving the radar signals, as well as circuitry, provided on a circuit board. That circuitry includes a microstrip circuit for connecting the high-frequency unit to the antenna, that microstrip circuit featuring a ground conductor. The ground conductor encompasses a first segment, a radial stub and a second segment, the length of the first segment corresponding essentially to one quarter of the predefined wavelength. The radial stub is positioned at the end of the first segment, the second segment connects to the end of the first segment and to the radial stub, and the second segment is grounded. Based on this design, a radar fill-level sensing device is obtained that can easily and reproducibly be implemented within the requirements of "intrinsically safe" ignition protection.

7 Claims, 2 Drawing Sheets

RADAR FILL-LEVEL SENSING DEVICE

BACKGROUND OF THE INVENTION

1. Field of the Invention

This invention relates to a radar fill-level sensing device encompassing a high-frequency unit that serves to generate and process radar signals at a predefined frequency and wavelength, an antenna for sending and/or receiving radar signals, as well as board-mounted microstrip circuitry for connecting the high-frequency device to the antenna, said microstrip circuitry including a ground conductor. A radar fill-level sensing device of this type has been described earlier, for instance in U.S. 2004/0066588 A1.

2. The Prior Art

Industrial applications often involve the need to measure the fill level of a substance, for instance a liquid or a bulk material, in a container such as a tank. This has been accomplished by a variety of techniques, differentiated between contact and non-contact level sensing methods. Contact level sensing methods whereby a component of the sensing device makes contact with the substance whose level is to be determined, include level sensing for instance, by means, of a float or a feeler plate. Contact level sensing also includes capacitive measurements in which the level-dependent capacity between an electrode immersed in the substance and the container wall is measured, as well as thermal measurements in which the increased heat dissipation upon immersion of a current-carrying, temperature-dependent resistance element into the substance serves as an indicator based on the fact that the electrical resistance changes as a function of the depth of immersion.

Non-contact fill-level sensing techniques include measurements, for instance, using a laser or ultrasound. In that case, a laser or ultrasound signal is transmitted, it reflects back off the surface level of the substance and the reflected signal is recaptured, its run time providing an indication of the fill level of the substance. Based on that same principle, the radar fill-level sensing method involves the generation of a microwave signal that is transmitted, via an antenna such as a rod or horn antenna, toward the substance whose fill level is to be gauged and whose surface reflects the signal, which is then recaptured by that same antenna or by another antenna.

There are in fact different radar fill-level measuring techniques. In the case of pulsed-radar level sensing, a microwave signal is transmitted in the form of short pulses which are either unmodulated or carrier-frequency modulated. The runtime of the microwave pulses from the transmitter to the surface of the substance and back to the receiver indicates the distance between the transceiver and the substance. The transceiver typically employs a single antenna. In the case of frequency modulated continuous-wave (FMCW) radar level sensing, the microwave signal is emitted in continuous fashion but its frequency is modulated, typically with consecutive ramping. Due to the time delay during signal propagation, the transmitted frequency will have changed by the time the reflected signal is received, with the differential frequency being an indicator of the distance from the reflecting surface and thus of the fill level. Then there is time domain re-flectometry (TDR) radar level sensing which is similar to the pulsed radar level sensing technique except that it is usually line-bound, employing electrical pulses without a carrier frequency.

Before the radar signal can be transmitted by the antenna in the direction of the surface of the substance whose level is to be determined, that radar signal must be transmitted from the high frequency generator to the antenna. That requires hard-wired conductors such as a coaxial cable that is composed of an inner conductor and an outer conductor with a dielectric in between, or a parallel line in which two conductors are held parallel to each other either by spacers or by a dielectric jacket. Also known are hollow waveguides consisting of a metal tube with a circular or square cross section allowing the electromagnetic high-frequency radar signal to propagate. The interior of the hollow waveguide may be filled with air or with a dielectric.

Finally, there have been flat conductors in the form of planar circuitry printed on a dielectric substrate. Such planar conductors may be in the form, for instance, of board-mounted microstrip conductors, in which case one side of the board supports the actual waveguide structures while the other side of the board is provided with a metallic coat that is separated from the said waveguide structures by the dielectric board. The advantage of planar circuits such as microstrip conductors is that they also allow for the simple planar mounting of other components on the board.

It is especially in the chemical and related industries that the radar level sensing device, along with other measuring devices, must be explosion-proof. For radar level sensing devices such explosion protection is particularly necessary in cases where, for example, the fill-level of an explosible substance contained in a tank is to be measured. DIN EN 50014 specifies standards for various ignition-protection classifications that govern electrical equipment in potentially explosive areas.

One of these ignition protection classifications is referred to as "intrinsically safe" or, for short, "ex-i". In the "intrinsically safe" protection category, the energy in intrinsically safe circuits is limited to a point where, neither in normal operation nor in the event of a failure such as a short-circuit, the conductors would be capable of igniting explosive mixtures, for instance, due to inadmissibly high temperatures, sparking or arcing. The intrinsic safety requirement is not limited to an individual component, but pertains to the intrinsically safe design of the complete circuitry system.

Circuitry of a corresponding, intrinsically safe design includes, apart from the interconnecting conductors, at least one intrinsically safe power supply and an associated accessory unit. The term intrinsically safe power supply refers to a power supply with only intrinsically safe circuit elements. What this means is that in the intrinsically safe power supply the voltage and current will always be so small that in the event of a is short circuit, a power interruption or a ground fault, the ignition energy will always remain below the minimum ignition energy, rendering the ignition of an explosible gas mixture impossible.

Intrinsically safe power supplies can be used for operation directly in a potentially explosive area. By contrast, the term associated accessory unit refers to modules in which not all circuit elements are intrinsically safe. However, an associated accessory unit encompasses at least one intrinsically safe circuit that may extend into the potentially explosive area. Accordingly, a signal that is not intrinsically safe is converted into an intrinsically safe signal. Examples of associated accessory units include pure signal isolators, commonly referred to as safety barriers, or signal-converting devices such as measuring transducers, transmitter feed units or isolation transformers.

In the case of the radar level sensing device described in the abovementioned U.S. 2004/0066588 A1, the board-mounted microstrip circuitry that serves to connect the high frequency unit to the antenna can be made intrinsically safe by means of a ground conductor that provides effective protection for low-frequency signals and direct-current signals. The part of the microstrip circuitry that serves as the ground conductor, having a length of essentially one quarter of the predefined wavelength of the radar signals, branches off at one end from the actual connecting line between the high frequency unit and the antenna, respectively, while its other end is grounded by through-contacts through the board connecting to a grounding layer on the other side of the board. Appropriate dimensioning of this ground conductor especially in terms of adequate width and safe grounding can render the circuitry intrinsically safe since it functions as a grounding element for low-frequency signal components or DC components, whereas the high-frequency signal components, not "recognizing" that type of grounding, remain unaffected.

However, the drawback of the design described in U.S. 2004/0066588 A1 is its poor reproducibility. Moreover, grounding provisions of the type described are difficult to simulate since drilling through the board and, respectively, providing the other side with the grounding layer must take into account the numerical simulation methods employed, which significantly adds to the complexity of the process.

SUMMARY OF THE INVENTION

It is, therefore, the objective of this invention to introduce a radar fill-level sensing device of the type described that can easily and reproducibly be designed along the "intrinsically safe" ignition-protection classification.

Based on the above-described design of a radar fill-level sensing device, the stated objective is achieved in that the ground conductor features a first segment, a radial stub and a second segment, that the length of the first segment essentially corresponds to one quarter of the predefined wavelength of the radar signals, that the radial stub extends from the end of the first segment, that the second segment connects to the end of the first segment and to the radial stub, and that the second segment is grounded.

Thus, as a key feature of the invention, the first segment of the ground conductor does not lead straight to ground but is provided with a radial stub, a planar fantail-like conductor structure essentially in the form of a quarter circle that may be part of a microstrip circuit. A radial stub of that kind works much like a filter, essentially producing a blocking capacitance for high frequencies. What this means is that providing the end of the first segment of the ground conductor with a radial stub produces a "virtual ground" for high frequencies, essentially leaving behind the radial stub nothing but DC components that are then grounded in conventional fashion for instance via through-contacts, to a grounding layer on the other side of the board.

Specifically, in a preferred embodiment of the invention, the tip of the radial stub is in contact with the end of the first segment and the beginning of the second segment. Also, in a preferred embodiment of the invention, the radius of the radial stub essentially corresponds to one quarter of the predefined wavelength or is slightly less than one quarter of the predefined wavelength.

While the length of the first segment of the ground conductor should essentially correspond to one quarter of the predefined wavelength of the radar signals, the length of the second segment of the ground conductor is less critical. However, in a preferred embodiment of the invention, the length of the second segment is less than half the predefined wavelength. Preferably, the length of the second segment is essentially selected between one eighth and three eighths of the predefined wavelength. But here as well, the length of the second segment most preferably corresponds to one quarter of the predefined wavelength.

When the ground conductor and in particular the first segment and the second segment are suitably dimensioned, with the first segment and the second segment being of adequate width, a single ground conductor may suffice to qualify for "intrinsically safe" ignition-protection classification. It has been found, however, that ground conductors of a width that large offer a narrow frequency bandwidth, which, of course, would only negatively affect the operation of the radar fill-level sensing device. Accordingly, a preferred embodiment of the invention provides for a plurality of ground conductors configured as described above for the purpose of qualifying as "intrinsically safe". In that case, the ground conductors can be substantially narrower than if only one ground conductor were used to assure intrinsic safety, and in the process the attainable frequency bandwidth will be improved significantly. Of course, the ground conductors must be so dimensioned that together they assure adequate grounding to meet the "intrinsically safe" ignition protection requirement.

There are numerous ways in which the radar fill-level sensing device according to the invention can be configured and enhanced. In that context, attention is invited to the dependent claims as well as to the following detailed description of preferred embodiments of the invention with reference to the attached drawings.

DETAILED DESCRIPTION OF THE PREFERRED EMBODIMENT

Figure 1:
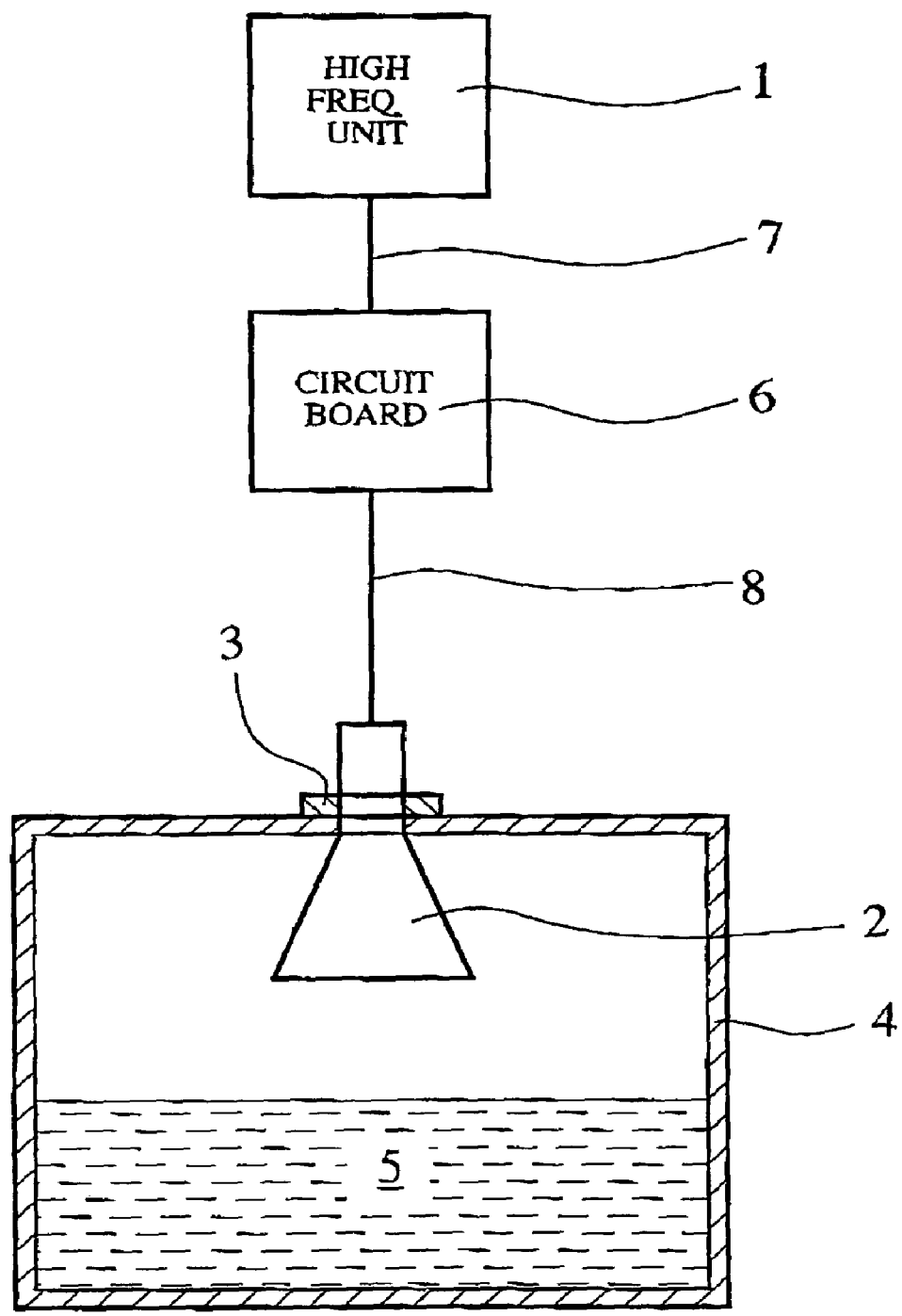
FIG. 1 is a schematic illustration of a radar fill-level sensing device according to a preferred embodiment of the invention.

The radar fill-level sensing device according to a preferred embodiment, shown in FIG. 1, encompasses a high-frequency unit 1 serving to generate and process radar signals of a predefined frequency, typically on the order of several GHz which corresponds to wavelengths of several centimeters. The antenna 2 serving to transmit and receive radar signals is a horn antenna, although a rod antenna would be equally suitable.

Figure 2:
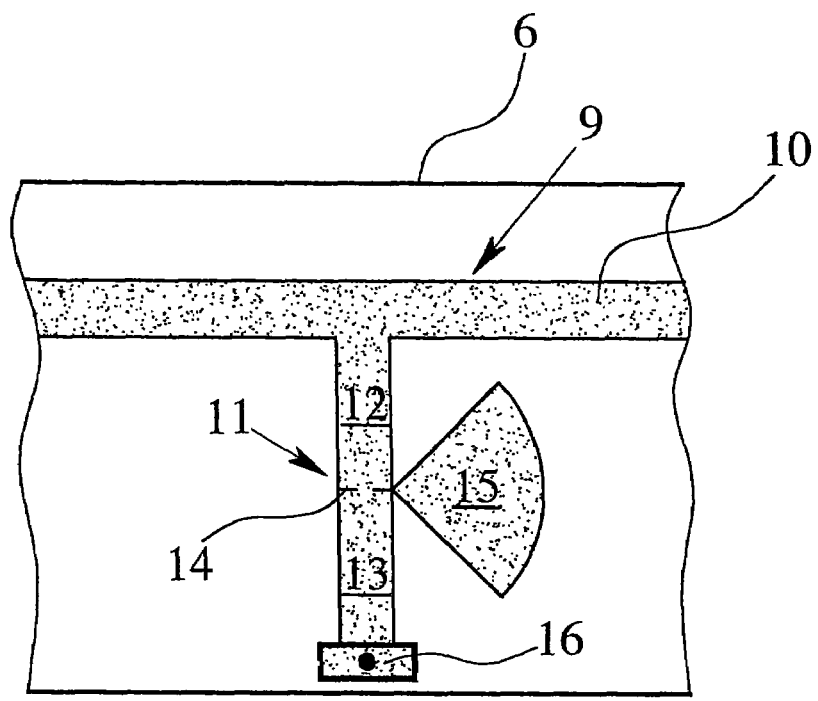
FIG. 2 is a schematic illustration of the configuration of the microstrip circuit with a ground conductor according to a first preferred embodiment of the invention.
Figure 3:
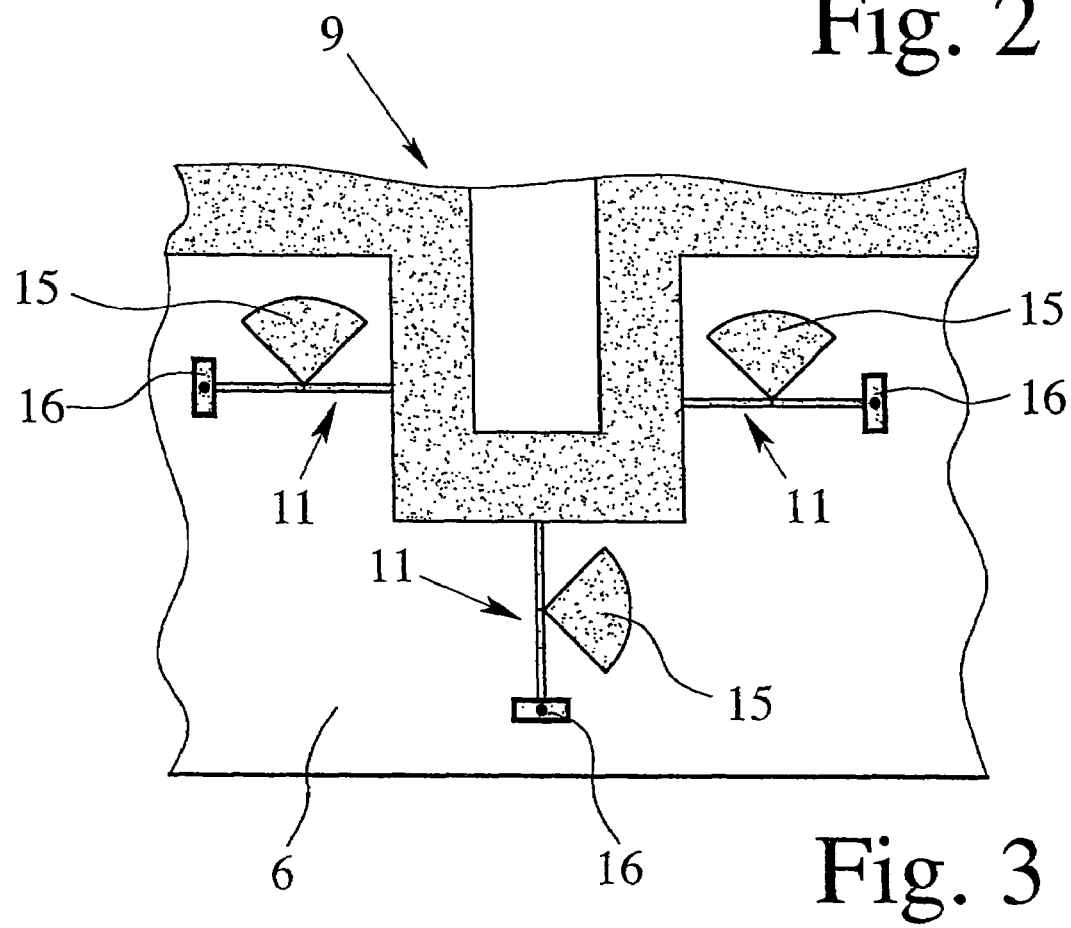
FIG. 3 is a schematic illustration of a microstrip circuit with three ground conductors according to a second preferred embodiment of the invention.

By way of a flange mount or screw connection 3, the antenna 2 is positioned in a container 4 that holds a substance 5 whose fill level is to be determined. Interpositioned between the high-frequency unit 1 and the antenna 2 is a circuit board 6 that connects to the high-frequency unit 1 via a lead 7 and to the antenna 2 via a lead 8. FIGS. 2 and 3 show details of a possible configuration of the circuit board 6.

FIG. 2 shows part of the configuration of the board 6 according to a first preferred embodiment of the invention. As can be seen in FIG. 2, one side of the board 6 is provided with a microstrip circuit 9 whose circuit segment 10 interconnects the lead 7 to the high-frequency unit 1 with the lead 8 to the antenna 2 while featuring a ground conductor 11. The ground conductor encompasses a first segment 12 and a second segment 13. At the point of transition 14 between the first segment 12 and the second segment 13, indicated by a dashed line, the tip of a radial stub 15 makes contact with the ground conductor 11. The dimensions and functions of the ground conductor 11 are as follows:

The length of the first segment 12 essentially corresponds precisely to one quarter of the predefined wavelength of the radar signals. In the first preferred embodiment of the invention described above, the length of the second segment 13 that connects directly to the first segment 12 similarly corresponds to one quarter of the predefined wavelength of the radar signals. The length of the second segment 13, however, is less critical than the length of the first segment 12, meaning that the length of the second segment 13 could be from one eighth to three eighths of the predefined wavelength of the radar signals. On its far end facing away from the first segment 12, the second segment 13 is grounded by means of through-contacts 16 that connect it to the grounding layer, not illustrated, on the other side of the board 6.

It is now important that the radial stub 15 be provided at the end of the first segment 12. There, the radial stub 15 essentially serves as a blocking capacitor for high frequencies, producing a "virtual short circuit" for high-frequency signal components. Accordingly, the second segment 13 of the ground conductor 11 following the radial stub 15 will practically contain DC signal components only, which can be grounded by conventional means, for instance via the through-contacts 16. The significant advantages of this design lie in the fact that it is highly reproducible and permits easy layout by numerical simulation techniques, since such simulation techniques need to deal with only one side of the circuit board 6.

FIG. 3 shows part of a board 6 with a microstrip circuit 9 according to a second preferred embodiment of the invention. In this case, several ground conductors 11, three ground conductors 11 to be exact, are provided for attaining intrinsic ignition-protection safety. Unlike the ground conductor 11 in the first preferred embodiment of the invention, the ground conductors 11 in the second preferred embodiment of the invention here described are substantially narrower, i.e. their respective width is well below 2 mm, the lower limit for attaining intrinsic safety with a single ground conductor 11. A single ground conductor 11 as dimensioned in the second preferred embodiment of the invention would not provide adequate grounding that would permit attainment of the "intrinsically safe" condition. The remedy in this case is the use of a combination of three ground conductors 11, the added benefit of this design being that, compared to the first preferred embodiment of the invention, the narrower ground conductors 11 allow for a significantly larger frequency bandwidth.

What is claimed is:

1. A radar fill-level sensing device, incorporating a high-frequency unit that serves to generate and process radar signals of a predefined frequency and wave-length, an antenna for transmitting and/or receiving the radar signals, as well as circuitry, provided on a circuit board and including a microstrip circuit, that serves to connect the high-frequency unit to the antenna, said microstrip circuit including several ground conductors, wherein the ground conductors encompasses a first segment, a radial stub and a second segment, respectively, the length of the first segment essentially corresponds to one quarter of the predefined wavelength, said radial stub is positioned at the end of the first segment, the end of the first segment and the radial stub connect to the second segment and the second segment is grounded, wherein the ground conductors are so dimensioned especially in terms of their width that intrinsic safety is attainable only through the combination of all ground conductors.

2. The radar fill-level sensing device as in claim 1, wherein the tip of the radial stub is in contact with the end of the first segment and with the beginning of the second segment.

3. The radar fill-level sensing device as in claim 1 or 2, wherein the radius of the radial stub essentially corresponds to one quarter of the predefmed wavelength or is slightly less than one quarter of the predefined wavelength.

4. The radar fill-level sensing device as in claim 1 or 2, wherein the length of the second segment is less than half the predefined wavelength.

5. The radar fill-level sensing device as in claim 4, wherein the length of the second segment is selected at between one eighth and three eighths of the predefined wavelength.

6. The radar fill-level sensing device as in claim 5, wherein the length of the second segment essentially corresponds to one quarter of the predefined wavelength.

7. The radar fill-level sensing device as in claim 1 or 2, wherein the second segment connects via a through-contact to a grounding layer provided on the other side of the circuit board.

* * * * *